United States Patent [19]
Petrus

[11] 3,860,273
[45] Jan. 14, 1975

[54] CLAMP FOR AIR FILTER HOSE
[75] Inventor: Steve Petrus, Conneautville, Pa.
[73] Assignee: Eagle-Picher Industries, Inc., Cincinnati, Ohio
[22] Filed: May 7, 1973
[21] Appl. No.: 357,946

[52] U.S. Cl. ................................ 285/244, 285/319
[51] Int. Cl. ............................................. F16l 33/00
[58] Field of Search ....... 285/243, 244, 314, 7, 331, 285/238, DIG. 22, 255, 257, 253, 260, 191, 185, 123; 24/81 B, 81 BF, 81 CC, 81 DM

[56] References Cited
UNITED STATES PATENTS

| | | | |
|---|---|---|---|
| 2,004,967 | 6/1935 | Williams | 285/317 X |
| 2,099,984 | 11/1937 | Lundquist | 285/238 |
| 2,360,485 | 10/1944 | Foster et al. | 285/319 |
| 3,248,133 | 4/1966 | Michnoff | 285/DIG. 22 |
| 3,749,425 | 7/1973 | Howland | 285/191 |

FOREIGN PATENTS OR APPLICATIONS
876,743  9/1961  Great Britain ..................... 24/81 B Primary Examiner—Dave W. Arola
Attorney, Agent, or Firm—Wood, Herron & Evans

[57] ABSTRACT

A quick attach clamp for attaching an air hose to a receiving member such as the inlet of an automotive air filter. The clamp is fastened inside the hose, across the diameter thereof, but presents minimal obstruction to air flow. The clamp presents longitudinal fingers adjacent the opposite inside surfaces of the hose, which fingers are stressed apart springlike in opposite radial directions and which grip the inlet side wall between them.

21 Claims, 2 Drawing Figures

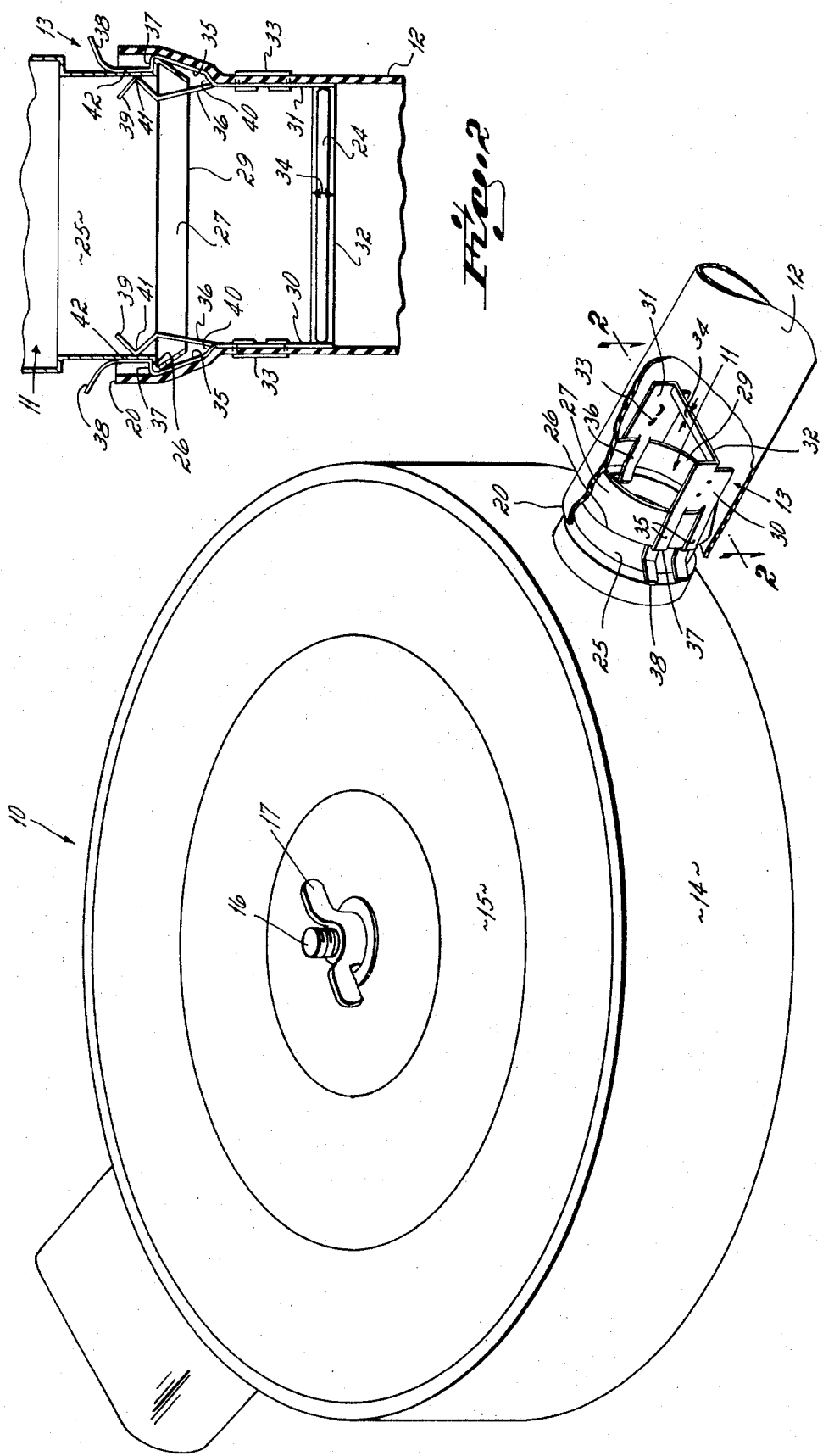

CLAMP FOR AIR FILTER HOSE

This invention relates to clamp apparatus of securing a pneumatic hose to a cooperating receiving part. The apparatus is useful, among other ways, for attaching an air hose to the inlet of an automobile air filter housing, and the invention is discussed herein with primary reference to such use, by way of example.

An automobile air filter element is commonly mounted in a metal housing having an inlet comprising a short, protruding open-ended tube or conduit. Air is drawn into the housing through this inlet and thereafter through the air filter to the carburetor of the engine. In order to supply cool air from outside the engine compartment, a flexible air hose leads to the inlet. In some instances, the hose has been merely slip-fitted over the inlet, but that has not been satisfactory because the hose could work loose, and need has existed for a more secure connection between the two.

It has, therefore, been a principal object of this invention to provide apparatus for positively but releasably securing a hose to the inlet of an air filter housing.

A further object of the invention has been to provide a unitary quick attaching apparatus for securing the end of a hose over a corresponding part, the securing apparatus presenting a minimum obstruction to the flow of air through the hose.

A further object of the invention has been to provide an apparatus for facilitating the connection of an air conducting hose to a corresponding inlet of an air filter housing.

In a preferred embodiment, the invention includes a unitary clamp which is adapted to be attached within a flexible elongated hose adjacent the end thereof, and which is configured to engage and clamp onto the projecting inlet of an air filter housing when the hose is pushed thereover.

This apparatus has two clamping portions or members, each presenting three side by side forwardly extending resilient spring fingers. Each member is secured at its rearward end to the other via an integral transverse cross piece or connector. The spring fingers are constructed and contoured to mate or cooperate with interlocking contours on the inlet tube of the housing to provide a positive latch against withdrawal of the hose.

The transverse connector has a length approximately equal to the internal diameter of the hose and thus holds the clamping members apart against opposite internal sides of the hose. The clamping members are attached to the hose at diametrically opposite sides thereof. The transverse connector is disposed in a plane generally parallel to the axis of the elongated hose, and presents minimal resistance to air flow through the hose.

The two outer or side resilient spring fingers of each clamping member are configured to cooperate with one surface (such as the exterior or outside wall) of the filter housing inlet, while a third central resilient spring finger of each clamping member is configured to cooperate with an opposite surface (such as the interior or inside wall) of the inlet. When the hose is pushed over the inlet, the two side fingers of each member ride over the exterior inlet wall and the central finger of each member rides over the interior wall. The inlet and/or the fingers have angulated or camming surfaces at their outer ends, and as these slide over the inlet end the two side fingers are spread apart (radially) from the third central finger until continued forward motion registers the fingers with the contours of the inlet. The outwardly and inwardly stressed fingers then lock the inlet wall between them, and thereby positively clamp the hose in position around the inlet. The hose can be easily released from the inlet by pulling outwardly on the two side fingers of each clamping member and simultaneously withdrawing the hose.

The invention thus provides a highly economical and simple apparatus which can be easily attached within a hose and which greatly facilitates assembly of the hose to the air filter housing in a positive but releasable manner.

These and other objects and advantages will become readily apparent from the following detailed description of a preferred embodiment of the invention and from the drawings in which:

FIG. 1 is a perspective view of an automobile air filter with a hose attached to it by a clamp in accordance with the invention, with a portion of the hose broken away so that the details of the preferred embodiment can be seen, and FIG. 2 is a cross-sectional view taken along the lines 2—2 of FIG. 1.

In the drawings, FIG. 1 shows an air filter housing 10 having an inlet 11 to which an elongated air hose 12 is attached via a clamping apparatus 13 in accordance with the invention. Housing 10 typically includes an air filter receiving bowl 14 and a separable top 15 which cooperate to form an enclosure for an air filter (not shown), in the manner known in the art. The bowl 14, the top 15 and the air filter are all secured together via bolt 16 and wing nut 17. In normal operation, air is drawn into the housing through the inlet 11.

A hose 12 conducts cool air to the inlet 11. The hose has a distal or remote end (not shown) positioned to take in fresh air from outside the engine compartment. A forward hose end 20 extends around the clamping apparatus 13 and over the end of the inlet 11. Hose end 20 and inlet 11 are configured so that the hose 12 fits the inlet in a reasonably tight manner.

In normal air filter housing, the inlet 11 generally comprises a tube or tubular conduit which may have a generally circular cross-section. In the particular embodiment shown, the inlet 11 is provided with a portion 25 of reduced diameter (see FIG. 2) and an outward transverse wall portion of increased diameter that forms a circumferential abutment 26. The primary function of this circumferential abutment is to cooperate with the clamping apparatus hereinafter described. (It will be understood and appreciated from this disclosure that the clamping apparatus can cooperate with the tube configurations. For example, the protruding inlet 11 could be provided with lugs stamped from the wall of the inlet.)

The circumferential abutment 26 leads outwardly to an inwardly tapering cam surface 27, which extends to an open end 29 of the inlet 11. The open end or orifice 29 of the inlet has a diameter which, as shown in FIG. 2, is substantially similar to that of the reduced portion 25.

When the engine (not shown) served by the filter is operating, air is drawn through hose 12 to opening 29 of inlet 11, into the housing 10. The hose is secured over the inlet 11, and has a distal end positioned to intake cooling air. Hose 12 may be of any type and is preferably flexible. While it is not shown in the drawings, an elongated corrugated hose having a flexible helical frame covered by a flexible material is especially suitable.

The clamping apparatus 13 is attached within the hose proximate the end 20 thereof and extends forwardly to the end 20 of the hose in order to cooperate with the inlet 11 and to positively but releasably secure the hose over the inlet 11. The clamp comprises two parallel spaced apart, forward, extending clamping members or arms 30 and 31. While a unitary clamping apparatus is depicted in the drawings, it can be appreciated that two or more separate clamping members may be utilized.

In the preferred embodiment, the clamping members 30 and 31 are connected together via a transverse cross piece or integral connector 32. This connector has a length which is approximately equal to the inside diameter of the hose 12, and it thereby positions the clamping members 31 and 30 against opposite internal walls or surfaces of the hose. Means such as staples 33 may be utilized to fasten the clamping members to the opposite walls of the hose. This particular construction has the advantage that the clamping apparatus tends to maintain the configuration of the hose.

The transverse cross piece 32 may be formed integrally with the clamping members 30 and 31, and the complete clamping apparatus can be stamped from a single unitary blank. The transverse connector 32 which extends across the interior of the hose has a side or a width designated at 34 and its thickness (apart from a rib 24) is substantially equal to the thickness of the clamping members. From the drawings it can be seen that the connector is bent at right angles to the clamping members, so that the width of the connector lies in a plane which extends generally parallel to the longitudinal axis of the elongated hose 12. In this manner, only the thickness of the convertor lies across the air passage and the connector only minimally restricts the free flow of air through the hose at this point.

Each clamping member 30 and 31 is provided with three side-by-side, forwardly extending resilient fingers. Two outer or side fingers of each member are each designated at 35 and a third or central finger of each member is designated at 36. The fingers are angulatd with respect to the respective members 30, 31, as at 40.

In operation, the central finger 36 of each member radially opposes the two side fingers 35, 35 so as to form a clamp. When the hose is pushed over the inlet 11, the two resilient fingers 35, 35 and the resilient finger 36 resist movement of the hose in the opposite radial directions, thereby clamping the inlet 11 therebetween to secure the hose to the inlet.

The fingers 35, 35 are configured or contoured to cooperate with the shape of the external wall of the particular inlet 11 to which the hose is to be mounted. In the embodiment shown, the fingers 35, 35 are provided with an inwardly extending, inlet or tube engaging transverse abutment 37 for registering with the circumferential abutment 26 provided on inlet 11. Each finger 35 has an outwardly flared end 38, while each finger 36 has an inwardly flared end 39. This particular construction provides a wide-mouthed path for receipt of the inlet end 27 as the hose is pushed over the inlet and facilitates the proper engagement of the clamping apparatus and the hose with the inlet.

It should be noted that inward of the flared end 39 of central finger 36, an angle or edge 41 is formed on the finger, and that this edge is biased as a spring radially toward the plane of surfaces 42 which are defined on each outer finger 35, 35 just inwardly of the flared ends 38 thereof.

As a hose is pushed over the inlet, the fingers 35 and 36 of each clamping member are urged radially apart. Inlet cam surface 27 leads the fingers 35, 35 radially outward, and the angulated leading surface 39 on the central finger 36 leads it radially inward and past inlet surface 27. The fingers are biased toward each other springlike, so that the inlet is gripped between the central finger edge 41 and the outer finger surfaces 42. Continued forward motion of the hose and the clamping member over the inlet registers the respective abutments 26 and 37 so that the fingers can spring toward each other and thereby positively clamp the inlet between them. As shown in FIG. 2, the central fingers 36 are contoured or constructed to cooperate with the interior wall of the inlet 11 so that in clamping position, the fingers 36 are in an unrelaxed or stressed state and thereby insure positive engagement of the fingers 35, 35 with the exterior of the inlet.

When it is desired to remove the hose from the air filter housing 10, it is only necessary to grasp the flared ends 38 of the outer fingers 35 and withdraw them outwardly with respect to the inlet 11 so as to move the abutments 37 and 26 out of registry. The hose can then be withdrawn and removed from the inlet.

The particular apparatus provided by the invention greatly facilitates the assembly of an elongated hose onto an air filter housing and it can be readily appreciated that it is only necessary to push the hose onto the inlet in order to positively but releasably secure it. The clamping apparatus described above can be very simply and economically made by appropriate forming and cutting techniques from a single blank of appropriate sheet material.

These and other objects and advantages will become readily apparent to one of ordinary skill in the art without departing from the scope of the invention and applicant intends to be be bound only by the claims appended hereto.

I claim:

1. Apparatus for connecting a hose, having a longitudinal axis, to a mating tubular element having opposite interior and exterior surfaces, said hose being slipped over the exterior surface of said tubular element and said clamp being attached to and disposed at least partially within said hose to cooperate with an end of said tubular element to connect said hose thereto, said apparatus comprising, a pair of clamping members, each of said members having three fingers, an integral connector connecting said clamping members one to the other, said connector having a thickness and width greater than said thickness, said width of said connector lying in a plane parallel to the longitudinal axis of said hose, said connector having a length approximately equal to the internal diameter of the hose, means connecting said clamping members to said hose, at least one of said fingers of each clamping member, when said hose and clamp are pushed over said tubular element, engaging one surface of said tubular element and the other fingers of the respective clamping member engaging an opposite surface in order to grip said tubular element and connect said hose thereto.

2. Apparatus as in claim 1 wherein said clamp is formed from a flat blank, the width of the integral connector lying in a plane of said blank and the clamping members, after forming, lying in two respective parallel planes transverse to the plane of the blank.

3. Apparatus as in claim 1 wherein each of said fingers are resilient and have flared ends so as to receive said tubular element therebetween, said fingers, when in position over said tubular element, being forced apart thereby and resiliently gripping said element.

4. Apparatus as in claim 3 wherein the fingers of each clamping member provide two outer and one central finger, the end of said central finger flaring inwardly toward said longitudinal hose axis and the ends of said outer fingers flaring outwardly away from said longitudinal hose axis, said outer fingers engaging said exterior surface of said tubular element and said central finger engaging said interior surface of said tubular element.

5. Apparatus as in claim 4 wherein said tubular element has at least one undulation therearound, said undulation having a diameter less than the diameter of a portion of said tubular element nearer said end, said fingers having cooperating configurations therein so that said fingers abut and positively grasp said tubular element.

6. Apparatus as in claim 5 wherein said hose extends over said undulation around said tubular element.

7. Apparatus as in claim 1 wherein said connector includes an integral rib portion.

8. Apparatus as in claim 7 wherein said hose is an air supply hose and wherein said tubular element is connected to and provides an inlet for an air filter.

9. Apparatus as in claim 3 wherein said tubular element includes circumferential abutment means thereon and wherein at least one of said fingers includes an abutting surface means for engaging the cooperating circumferential abutment means of said tubular element to hold said clamp against withdrawal axially therefrom, another of said fingers including a tube engaging means disposed forwardly of said abutting surface means on said one finger so that said abutting surface means and said circumferential abutment means, when said clamp is in place, are located between the end of said tubular element and said tube engaging means.

10. Apparatus as in claim 9 wherein said other finger having said tube engaging means is flared inwardly at its forward end toward said longitudinal hose axis from said tube abutting means thereon.

11. An integral clamp apparatus for connecting the forward end of a hose, having a longitudinal axis, to a tubular element, said clamp apparatus being formed integrally from a single flat blank and comprising, a pair of substantially parallel clamping members, each clamping member having two outer fingers and one central finger extending forwardly thereof, and an integral connector extending between and connecting said clamping members one to the other rearwardly of said fingers.

12. Apparatus as in claim 11 wherein, the integral connector has a thickness, and has width which lies in the plane of said blank, the clamping members, after forming, lying in two respective parallel planes transverse to the plane of the blank.

13. Apparatus as in claim 11 wherein said connector has a thickness and a predetermined width greater than said thickness, said width lying in a plane extending forwardly and rearwardly of said clamping members and parallel to the longitudinal axis of said hose.

14. Apparatus as in claim 13 wherein said connector has a length approximately equal to the internal diameter of said hose and wherein said connector, in use, extends diametrically across said hose.

15. Apparatus as in claim 14 wherein said connector includes an integral longitudinal rib.

16. Apparatus as in claim 14 wherein each of said fingers have flared ends to accommodate said tubular element upon initial engagement therewith.

17. Apparatus as in claim 16 wherein the ends of said two outer fingers are flared outwardly away from the longitudinal axis of said hose, and wherein the ends of said central fingers are flared inwardly toward the longitudinal axis of said hose.

18. Apparatus as in claim 17 wherein said tubular element includes abutment means on an exterior surface thereof, said apparatus including, corresponding abutment surfaces on said outer fingers to positively engage the abutment means on said tubular element.

19. Apparatus as in claim 18 wherein said outer fingers and said central fingers are spring fingers which are respectively biased in opposite directions when urged apart by said tubular element so as to clamp said tubular element respectively therebetween, said outer fingers engaging the exterior surface of said tubular element and said central fingers engaging an internal surface thereof.

20. Apparatus as in claim 19 wherein said outer fingers include means for engaging said abutment means, and said central finger includes a tube engaging means forwardly of said means for engaging said abutment means.

21. Apparatus as in claim 20 wherein said central finger flares inwardly toward said longitudinal axis from said tube engaging means.

* * * * *